June 15, 1965 S. L. FUDALEY 3,189,693

2-TO-4 WIRE CONVERTER

Filed Sept. 1, 1960

INVENTOR.
SOLLY L. FUDALEY

BY [signature]

ATTORNEY

United States Patent Office 3,189,693 Patented June 15, 1965

3,189,693
2-TO-4 WIRE CONVERTER
Solly L. Fudaley, Chicago, Ill., assignor to International Telephone and Telegraph Corporation, New York, N.Y., a corporation of Maryland
Filed Sept. 1, 1960, Ser. No. 53,390
9 Claims. (Cl. 179—170)

This invention relates to signal transmission systems and more particularly to 2-to-4 converters for use in such systems.

In electrical signal transmission systems, it is frequently necessary to interconnect a two-wire circuit with a four-wire circuit. This interconnection is usually completed by a device commonly called a "2-to-4 wire converter" (the term also covering means for completing 4-to-2 wire conversion). More particularly, when these converters are used in telephone systems, the two-wire circuit usually provides a two-way voice channel and the four-wire circuit usually provides two one-way voice channels. Very often voice signal amplifying means are included in each one-way channel. A problem is that signals amplified in a first one-way channel must not feed back into the other one-way channel because such feedback would be reamplified and the system would break into oscillation.

Known converters utilize hybrid networks which interconnect the two-wire and four-wire lines by splitting a voice signal to provide two equal currents which are bucked in the hybrid network to cancel feedback between the two one-way channels. It is, however, very difficult to produce two exactly equal currents because the signal splitting depends upon matching the impedance of a fixed network and the impedance of the two-way voice channel, the latter impedance varying with age, humidity, etc. Therefore, it has been necessary to limit the stability margins within which the hybrid network type converter may operate, thus causing an unduly high installation and maintenance cost. In addition, the band pass characteristics of the hybrid network cause severe loss of signal fidelity. Moreover, in hybrid network type converters an open or short on an associated line causes the entire system to fail.

Accordingly, it is an object of this invention to provide new and improved 2-to-4 wire converters. More particularly, it is an object to provide telephone system converters which do not rely upon the maintenance of an impedance balance between a two-wire circuit and a balancing network.

Another object of this invention is to provide 2-to-4 wire converters which prevent conditions that may cause circuit oscillations.

Yet another object of this invention is to provide 2-to-4 wire converters having an improved frequency response.

Still another object of this invention is to provide 2-to-4 wire converters which continue to function properly even when the two-wire line is shorted or open.

In accordance with one aspect of this invention, these and other objects are accomplished by means of a 2-to-4 wire converter which includes a number of interconnected amplifiers. The voice signals which are received over an incoming one of the one-way channels on the four-wire side are split into two parts, one split signal being amplified and applied to the two-way channel and the other split signal being applied to control a biasing potential of an amplifier in the other or outgoing of the one-way channels. This amplifier is driven substantially to cut-off by the other split signal to prevent the signals received over the incoming channel from reaching the outgoing channel.

The above mentioned and other features and objects of this invention and the manner of obtaining them will become more apparent and the invention itself will be best understood by reference to the following description of an embodiment of the invention taken in conjunction with the accompanying drawing wherein.

Figure 1:
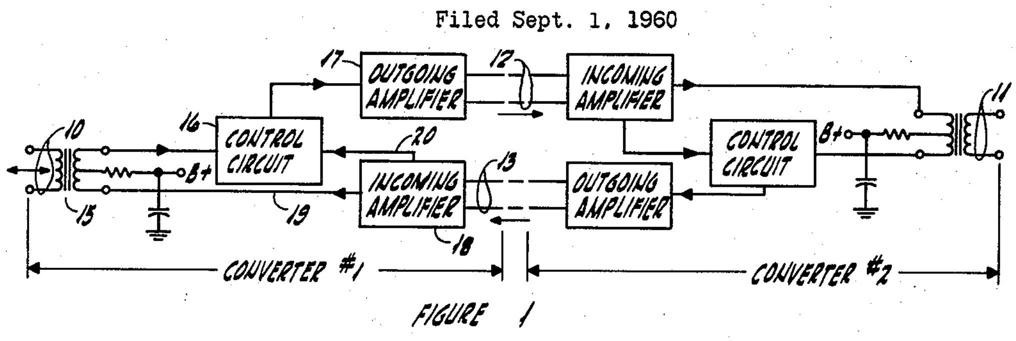
FIG. 1 is a block diagram showing a telephone system having a pair of 2-to-4 wire converters.

Briefly, the principles of the invention may be understood best by making reference to the block diagram of FIG. 1 which shows an exemplary telephone system. More specifically, a first two-wire, two-way voice channel is shown at 10 and a second two-wire, two-way channel is shown at 11. A four-wire line, including two one-way voice channels, is shown at 12, 13. The one-way channel 12 provides west-east communication and the one-way channel 13 provides east-west communication.

The first of the two-wire lines, 10, is interconnected with the four-wire lines 12, 13 by way of "Converter #1" which includes a coupling transformer 15, a control circuit 16, an outgoing amplifier 17, and an incoming amplifier 18 . The second two-wire line 11 is interconnected with the four-wire line by way of "Converter #2" which includes similar parts.

To transmit and receive voice signals, the two-wire line 10 is connected to the primary winding of the coupling transformer 15. The transformer has a center tapped secondary winding coupled to the incoming and outgoing channels. Therefore, the voice signals received over the two-wire line 10 are inductively coupled through the upper half of the secondary winding of transformer 15 and applied through control circuit 16 to outgoing amplifier 17. The signals inductively coupled through the lower half of transformer 15 have no effect at amplifier 18 because they appear in its output circuit. The amplifier 17 brings the voice signals up to the required strength and the resulting signal is sent over the two-wire line 12 to "Converter #2."

Incoming signals received over conductors 13 are split into two parts in incoming amplifier 18, one part being amplified and applied over conductor 19 and through the inductive coupling from the lower half of the secondary winding of coupling transformer 15 to its primary winding and line 10. The other part of the signal split in incoming amplifier 18 biases control circuit 16 (via conductor 20) to block the transmission over outgoing line 12 of any signals received over line 13.

Figures 2, 3:
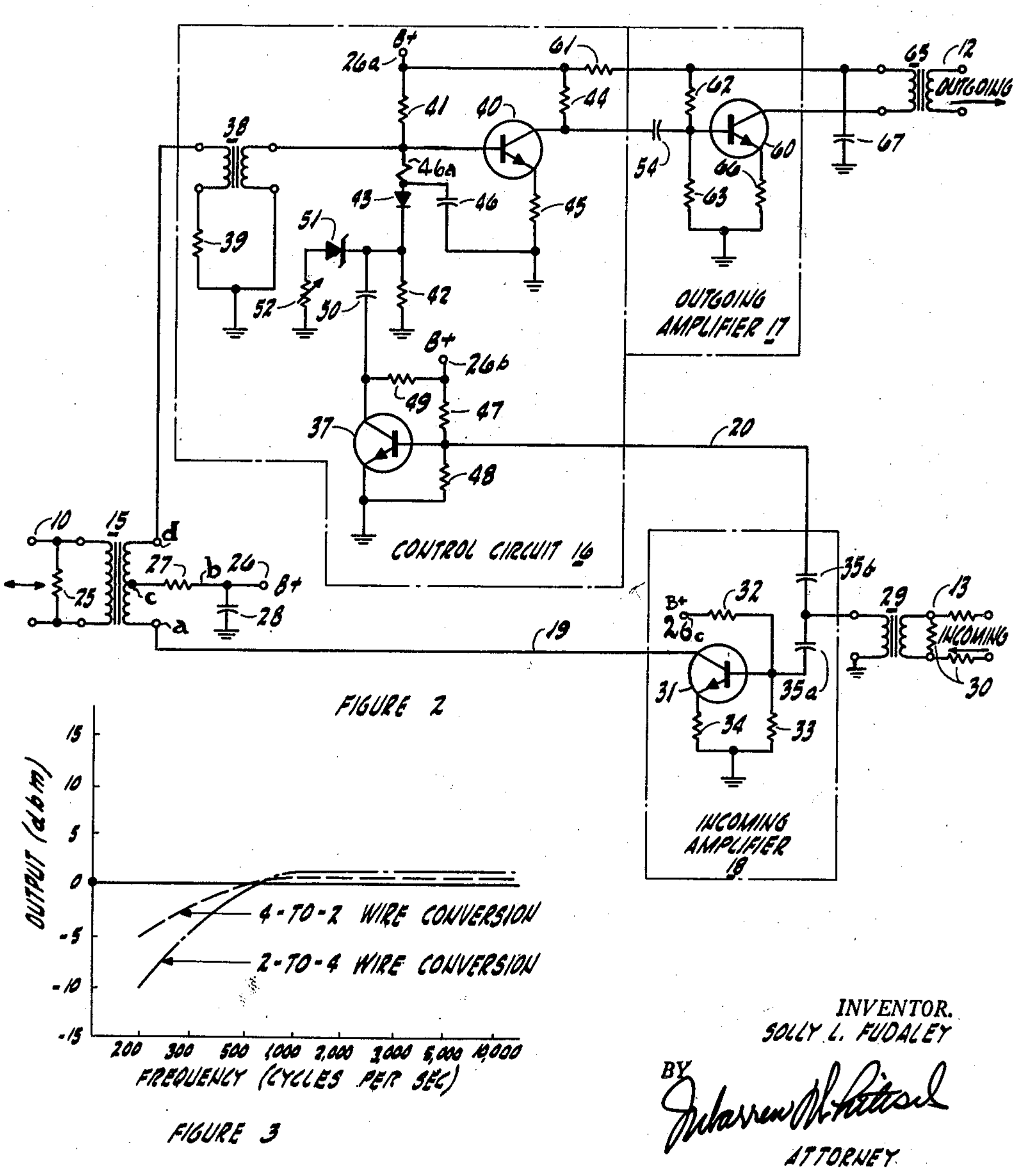
FIG. 2 is a schematic circuit diagram showing the circuitry that is used to complete the hollow blocks of FIG. 1.
FIG. 3 is a graph showing the frequency response curve for the circuitry of FIG. 2.

For a detailed description of the circuits which are used to fill the hollow blocks of FIG. 1, reference is made to the schematic circuit diagram of FIG. 2. The two-way, two-wire line 10 is shown as connected to the primary winding of transformer 15 and a parallel connected impedance matching resistor 25. The center tap of the secondary winding is extended to a B+ supply, which may be a battery 26, by way of a load resistor 27. A decoupling filter capacitor 28 is connected in parallel with the B+ power supply. The incoming channel 13 connects with the incoming amplifier 18 by way of a repeat coil 29 and three impedance matching resistors 30. The input amplification is here provided by an NPN transistor 31 connected in a common emitter configuration. The base electrode of transistor 31 is biased over a circuit traced from B+ supply 26c through resistors 32 and 33 to ground. The emitter bias provided by resistor 34 makes the emitter negative relative to the base.

Means are provided for splitting the voice signal received over the incoming channel 13. More specifically, this splitting means is here shown as a pair of capacitors 35*a*, 35*b*, which are connected in parallel. With the capacitor 35*a* connected in series between the secondary winding of repeat coil 29 and the base or control electrode of transistor 31, a first of the split signals (i.e., the current passing through capacitor 35*a*) is amplified in transistor 31 and fed over conductor 19 to the two-way channel 10 by way of transformer 15. The other of the split signals (i.e., the current passing through capacitor 35*b*) is applied over conductor 20 to the base or control electrode of transistor 37 in the control circuit 16; the effects produced by this signal will become more apparent as this description proceeds.

Each time that the base electrode of transistor 31 is made more positive by the first split signal applied through capacitor 35*a*, the current flowing through its emitter-collector circuit increases. Conversely, when the base becomes more negative, the emitter-collector current decreases. Thus, an amplified voice signal is impressed upon the circuit traced from ground through resistor 34 through the emitter-collector of transistor 31.

Means are provided for sharply reducing the transfer of signals received from incoming channel 13 to control circuit 16 without substantially effecting the transfer from channel 13 to channel 10. More particularly, the signal received over channel 13 causes current flow from ground through resistor 34, the emitter-collector of transistor 31, conductor 19, the lower half of the right-hand winding of transformer 15, and load resistor 27 to B+ supply 26. The voice signal is developed across the load circuit extending between points *a*, *b*. Also, there is a current flow from conductor 19 through the entire right-hand winding of transformer 15, the left-hand winding of transformer 38 and load resistor 39 to ground.

With this arrangement it was found that, in one exemplary system, the current flow from conductor 19 divided at point *c* to provide substantially a 1:1 transfer of voice signals from channel 13 to channel 10 and a 20–30 db loss in the signals transferred from incoming channel 13 to control circuit 16. As will become more apparent, the advantage of this arrangement is that less power is required to suppress the signal transferred from channel 13 to circuit 16 without in any way reducing the audibility of acoustic signals heard by a subscriber served by channel 10. Moreover, the transfer of the voice signals from channel 10 to circuit 16 is at a 1:1 ratio because the full right-hand (as viewed in FIG. 2) winding of transformer 15 (points *a*, *d*) is effective since resistance 27 is much higher than the internal resistance of transistor 31. Hence, very little current flowing in the right-hand (as viewed in FIG. 2) winding is diverted through resistor 27 when the signals are transferred from channel 10 to channel 12.

The principal components of the control circuit 16 include the coupling transformer 38, a pair of NPN transistor amplifiers 37, 40, each of which is coupled in a common emitter configuration, and an automatic gain control circuit fed over conductor 20. The left-hand winding of the coupling transformer 38 is in series with a current limiting load resistor 39 connected to ground for keeping B+ supply 26 off the base of transistor 40. The base bias for transistor 40 is derived from a voltage divider including resistor 41, and the right-hand winding of transformer 38 connected between the B+ supply 26*a* and ground. Resistor 44 provides the load for the collector of transistor 40 and the resistor 45 controls the current and gain in the stage. A filter capacitor 46 is connected via a voltage dropping resistor 46*a* to the base of transistor 40 for filtering a biasing potential received from transistor 37.

The transistor 37 has its base bias applied from a voltage divider including the series connected resistors 47, 48 connected between ground and B+ supply 26*b*. The collector load is provided by resistor 49. With each of these biasing circuits, the emitter is negative relative to the base.

Means are provided for utilizing the second portion of the split signal to prevent the voice signals received over the incoming conductors 13 from reaching the outgoing conductors 12, thus preventing circuit oscillations. More particularly, the circuit for accomplishing this function includes the capacitor 35*b*, the conductor 20, the transistor 37, a capacitor 50, a zener diode 51, an adjustable potentiometer 52, and the voltage divider network 41 and transformer 38. The capacitor 50 couples the output or collector electrode of transistor 37 to the bias control circuit. The diode 43 is a rectifier that prevents the application of a positive biasing potential from capacitor 50 to the base electrode of transistor 40. The zener diode 51 limits the voltage of the control signal derived from the second split signal and applied through the emitter-collector circuit of transistor 37 and the capacitor 50 to the junction between diode 43 and resistor 42. The series connected adjustable resistor 52 limits current flow through the zener diode 51 and provides for an adjustment of the level of the voltage limited by the zener diode 51.

In carrying out this aspect of the invention the circuit values are selected so that the charge built upon capacitor 50 (and limited by zener diode 51), responsive to the second split signal (the current flowing through capacitor 35*b*) is applied through diode 43 to reduce the positive bias of the base electrode of NPN transistor 40. Thus, transistor 40 is biased toward cut-off each time that voice currents appear in incoming channel 13. To provide a hybrid transfer the transistor 40 is not completely cut-off, thus allowing voice transfer from channel 10 to channel 12 when both subscribers talk at the same time. If the transistor 40 actually cuts-off, the circuit functions as an echo suppressor. With transistor 40 cut-off or almost cut-off, little or no current received over incoming channel 13 may be transferred to outgoing channel 12. Since capacitor 46 filters the current flow through the emitter-collector circuit of transistor 37, the phase relation between the two split signals appearing at the base of transistor 40 is not important.

A particular advantage of the described circuit is that it is no longer necessary to balance the variegated impedance of telephone lines by the fixed impedance of a balancing network. With the arrangement shown and described herein, all circuit values may be selected and properly maintained within the control circuit 16. Moreover, to compensate for any fluctuations which do occur, fine adjustments in the potential applied through capacitor 50 to the base of transistor 40 may be made by the simple expedient of adjusting resistor 52. Furthermore, by eliminating the necessity for maintaining a precise balance across the windings of a hybrid coil, the limitations upon the band of frequencies which may be transmitted through the system has also been greatly reduced. Therefore, the frequency response curve is greatly improved.

For a more graphic showing of the extent of the improvement in the frequency response of the converter, reference is made to FIG. 3. As there shown, the characteristic curve of a converter actually constructed in accordance with the teachings of this invention, was relatively flat over the range from about 500 cycles per second to 10,000 cycles per second with only a small drop on the low end.

A still further advantage resulting from the elimination of the necessity for a precisely balanced network is that an open or a short on either of the channels 12, 13 has substantially no effect on transmission of voice signals over the other channel. Heretofore, an open or short unbalanced the hybrid networks and prevented satisfactory use of either channel.

Next, reference is made to the manner in which voice signals are transmitted from two-way voice channel 10 to outgoing voice channel 12.

Voice signals received over channel 10 are inductively coupled across both upper and lower halves of transformer 15. Virtually no current flows through high resistance 27. The current flowing through the collector of transistor 31 has no effect in channel 13. The current flowing through the coupling transformer 38 biases the base or input electrode of transistor 40. Since there is no signal on conductor 20 at this time, virtually no current flows through the emitter-collector of transistor 37 to exert an influence upon the base bias of transistor 40. Therefore, the voice signal applied through transformer 38 to the base of transistor 40 causes an amplified current flow through its emitter-collector circuit to a coupling capacitor 54 and the outgoing amplifier 17.

The outgoing amplifier 17 includes an NPN transistor amplifier 60 connected in a common emitter configuration with its base bias provided by a voltage divider including the resistors 61–63 connected in series between the B+ supply 26*a* and ground. The load circuit is completed by way of the primary winding of an output repeat coil 65. The base to emitter bias circuit is completed by way of resistor 66. A capacitor 67 is connected between the primary of the output repeat coil 65 and ground to provide a high frequency by-pass circuit for eliminating noise and reducing the high frequency response.

With this arrangement, the voice signals passed from the control circuit 16 to the outgoing amplifier 17 via coupling capacitor 54 are applied to the base electrode of transistor 60. Responsive thereto, an amplified current flows through the emitter-collector circuit of transistor 60 and a signal is induced across repeat coil 65 to the outgoing channel 12.

Hence, it is seen that the circuit of FIG. 2 provides a 2-to-4 wire converter wherein voice signals appearing on conductors 10 are amplified and transmitted over outgoing conductors 12. Incoming voice signals appearing on conductors 13 are amplified and transmitted over conductors 10. However, the signal which is split across capacitors 35*a*, 35*b* are cancelled in circuit 16 to prevent transmission of voice signals between channel 13 and channel 12. In this manner, there is no feedback which may tend to cause channels 12 and 13 to oscillate. Moreover, there is no problem of providing a fixed impedance for matching the variegated impedance of a number of two-way voice channels, here depicted as the conductors 10.

It should be understood that many of the devices described above may be replaced by other similar devices. For example, those skilled in the art may readily perceive how the exemplary NPN transistors can be replaced by PNP transistors, electron tubes, or other well known devices. In a similar manner, any well known rectifier may be substituted for diode 43 and any voltage limiting device may be substituted for zener diode 51. Quite obviously, other examples could be selected to illustrate substitutions which may be made without departing from the teachings of this invention.

It is to be understood that the foregoing description of specific examples of this invention is not to be considered as a limitation on its scope.

I claim:

1. A 2-to-4 wire converter comprising a two-way voice channel, a one-way outgoing voice channel, a one-way incoming voice channel, means including a first transistor for amplifying voice signals received over said two-way channel, means coupled to an output electrode of said first transistor for applying said amplified signals to said outgoing channel, means comprising a pair of parallel connected capacitors for splitting voice signals received over said incoming voice channel, means including one of said capacitors for applying a first of said split signals to said two-way channel, means including a second transistor coupled to control the bias on a control electrode of said first transistor, and means comprising the other of said capacitors for applying the other of said split signals to a control electrode of said second transistor for controlling said bias to prevent the transfer of voice signals from said incoming voice channel to said outgoing voice channel.

2. A small signal amplifier control circuit comprising a pair of transistors, at least one of said transistors being part of a voice channel, means for applying a biasing potential to a control electrode of one of said transistors, an output electrode of the other of said transistors connected to control said biasing potential, and means for splitting a voice signal and applying a first of said split signals to a control electrode of said one transistor and the other of said split signals to a control electrode of the other of said transistors, the signal appearing on the output electrode of said other transistor driving said one transistor toward cut-off.

3. A voice signal amplifier control circuit comprising a pair of transistors, one of said transistors being part of a voice channel, a voltage divider for applying a biasing potential to a control electrode of one of said transistors, a diode, an output electrode of the other of said transistors connected via said diode to said voltage divider to control the biasing potential applied to said control electrode, means interposed between said diode and said control electrode for filtering the output of said other transistor to provide a relatively smooth D.C. potential at the control electrode of said one transistor, and means for splitting a voice signal and applying a first of said split signals to a control electrode of said one transistor and the other of said split signals to a control electrode of the other of said transistors, the signal appearing on the output electrode of said other transistor changing said biasing potential to drive said one transistor toward cut-off.

4. A control circuit comprising a pair of transistors, at least one of said transistors being incorporated in a voice signal transmission channel, means for applying a biasing potential to a control electrode of one of said transistors, an output electrode of the other of said transistors connected to control said biasing potential, means including a zener diode connected to limit the potential of signals appearing on said output electrode, and means for splitting a voice signal and applying a first of said split signals to a control electrode of said one transistor and the other of said split signals to a control electrode of the other of said transistors, the signal appearing on the output electrode of said other transistor and limited by said zener diode driving said one transistor toward cut-off.

5. A signal control circuit comprising a pair of transistors, means including at least one of said transistors for providing a voice channel, a voltage divider for applying a biasing potential to a control electrode of one of said transistors, an output electrode of the other of said transistors connected to said voltage divider to control the biasing potential applied to said control electrode, and means for splitting a voice signal and applying a first of said split signals to a control electrode of said one transistor and the other of said split signals to a control electrode of the other of said transistors, the signal appearing on the output of the other of said transistor changing said biasing potential to bias said first transistor toward cut-off.

6. A 2-to-4 wire voice signal control circuit comprising a pair of transistors, a voltage divider for applying a biasing potential to a control electrode of one of said transistors to cause said one transistor to operate as a small signal amplifier, an output electrode of the other of said transistors connected to said voltage divider to control the biasing potential applied to said control electrode, a capacitor for filtering the output of said other transistor, and means for splitting a voice signal and applying a first of said split signals to a control electrode of said one transistor and the other of said split signals to a control electrode of the other of said transistors, the signal appearing on the output electrode of said other transistor changing said biasing potential to cut-off said one transistor.

7. A 2-to-4 wire converter comprising a two-way voice channel, a one-way outgoing voice channel, a one-way incoming voice channel, a coupling transformer having a primary winding and a center tapped secondary winding, said two-way channel being coupled to said primary winding, said outgoing channel being coupled to one end of said secondary winding, said incoming channel being coupled to the other end of said secondary winding, means associated with said outgoing channel for amplifying voice signals received over said two-way channel via the inductive coupling across said transformer, means comprising a pair of parallel conected capacitors associated with said incoming voice channel for splitting voice signals received thereover, means for applying a first of said split signals to said two-way channel via the inductive coupling across said transformer, said first split signal also being applied to said outgoing channel via said transformer, and means for applying the other of said split signals to drive said amplifying means substantially to cut-off for preventing the transfer of said voice signal received over said incoming voice channel to said outgoing voice channel.

8. A 2-to-4 wire converter comprising a two-way voice channel, a one-way outgoing voice channel, a one-way incoming voice channel, a first coupling transformer having a primary winding and a center tapped secondary winding, a second coupling transformer, said two-way channel being coupled to said primary winding, said outgoing channel being coupled to one end of said center tapped winding via said second coupling transformer, first means coupled to said second coupling transformer for amplifying voice signals received over said two-way channel and applying said amplified signals to said outgoing channel, means comprising a pair of parallel connected capacitors coupled to said incoming voice channel for splitting voice signals received over said incoming voice channel, means coupled between said incoming voice channel and the other end of said center tapped winding for amplifying a first of said split signals, said amplified split signal being inductively applied across said first transformer to said two-way channel and to said first amplifying means, and means for applying the other of said split signals to control the bias potential on a control electrode of said first amplifying means, said other split signal having a magnitude adequate to prevent the transfer of said amplified first split signal to said outgoing voice channel.

9. In a 2-to-4 wire converter for use in a telephone system, the combination comprising a two-wire, two-way voice channel, and a pair of two-wire, one-way voice channels, means comprising a first transistor for amplifying voice signals received over said two-way channel, means for applying a biasing potential to a control electrode of said first transistor, means for applying the output signals of said first transistor to an outgoing one of said one-way channels, means for splitting voice signals received over an incoming one of said one-way voice channels, means for applying a first of said split signals to said two-way channel, means comprising a second transistor for amplifying the other of said split signals, and means for applying said amplified other split signal to control the biasing potential applied to the control electrode of said first transistor for preventing the transfer of voice signals from said incoming voice channel to said outgoing voice channel.

References Cited by the Examiner

UNITED STATES PATENTS

| | | | |
|---|---|---|---|
| 2,455,914 | 12/48 | Biltz | 179—170 |
| 2,880,330 | 3/59 | Linvill | 307—88.5 |

FOREIGN PATENTS

| | | |
|---|---|---|
| 114,216 | 9/29 | Austria. |

OTHER REFERENCES

Richards, "Digital Computer Components and Circuits," Van Nostrand, 1957.

ROBERT H. ROSE, *Primary Examiner.*

L. MILLER ANDRUS, WALTER L. LYNDE, *Examiners.*